United States Patent [19]

Curzon et al.

[11] Patent Number: 5,597,522
[45] Date of Patent: Jan. 28, 1997

[54] METHOD OF MAKING POLYOLEFIN/FILLER COMPOSITE MATERIALS

[75] Inventors: Alan D. Curzon, Northwich; Ronald G. White, Wilmslow; Aidan P. R. Jones, Manchester, all of United Kingdom

[73] Assignee: Shell Research Limited, London, England

[21] Appl. No.: 350,636

[22] Filed: Dec. 7, 1994

Related U.S. Application Data

[63] Continuation-in-part of Ser. No. 75,449, Jun. 11, 1993, abandoned.

[30] Foreign Application Priority Data

Jun. 19, 1992 [EP] European Pat. Off. ............. 92305671

[51] Int. Cl.$^6$ ................................. C08J 9/32; C08K 7/28
[52] U.S. Cl. .................... 264/177.16; 264/211; 264/349; 523/218; 523/219
[58] Field of Search ..................... 523/218, 219; 428/325; 264/109, 112, 349, 211, 176.1, 177.16

[56] References Cited

U.S. PATENT DOCUMENTS

| | | | |
|---|---|---|---|
| 4,692,480 | 9/1987 | Takahashi et al. | 523/218 |
| 5,032,627 | 7/1991 | Wilson et al. | 523/218 |
| 5,158,727 | 10/1992 | Coleman-Kammula et al. | 264/112 |

FOREIGN PATENT DOCUMENTS

| | | | |
|---|---|---|---|
| 2359060 | 5/1975 | Germany | 264/210.6 |

*Primary Examiner*—Mathieu D. Vargot

[57] ABSTRACT

A smooth-surfaced tape or sheet of composite syntactic material made up of a polyolefin and, as filler, hollow microspheres, is formed by extrusion through a die having a land length to thickness ratio less than 7:1 at a temperature of about 215° C. Such tapes are wrapped around pipes to provide insulation.

5 Claims, No Drawings

METHOD OF MAKING POLYOLEFIN/FILLER COMPOSITE MATERIALS

This is a continuation-in-part of U.S. patent application Ser. No. 08/075,449, filed Jun. 11, 1993, now abandoned.

FIELD OF THE INVENTION

This invention relates to polyolefin/filler composite materials in which the filler comprises hollow microspheres. The invention also relates to the use of such materials in thermal insulation, and in particular the insulation of both rigid and flexible flowlines, e.g., for use underwater.

BACKGROUND OF THE INVENTION

There are particularly onerous requirements for an insulating material for an underwater flowline. A material containing microspheres should be resistant to their breakage during the preparation of the material and subsequent application to a pipe. The material should also permit substantial tensile elongation, exhibit low creep over a long period, perhaps a service life of 30 years during which hot oil may be conveyed within the flowline, and have excellent mechanical properties.

Polyolefin/filler composite materials in which the filler comprises "glass bubbles" are described in Research Disclosure 253015. This article discloses that it is possible to compound "glass bubbles" with, inter alia, polypropylene using extrusion equipment, with less than 5% by weight breakage to produce low-density composite materials. Proposed uses thereof are extruded parts for buoyancy and thermal insulation and large automotive moldings.

When it was attempted, during experimentation, to incorporate microspheres into a polyolefin to make a composite material having properties suitable for rigorous applications such as flowline insulation, it was found to be possible to do so adequately only by using base polypropylenes of high Melt Flow Index (MFI). The resulting composite materials generally had MFI values which were too high for application by the "pipe extrusion" method and/or had unsuitable mechanical properties for flowline insulation. When it was attempted to incorporate microspheres in a base polypropylene of low MFI, a substantial proportion of the microspheres were broken during the compounding or subsequent extrusion, so that the insulation properties were inadequate.

EP-A-0473215 discloses a process of producing a composite material which can be employed in rigorous application areas, for example as an insulating casing for an underwater flowline that can be applied by coextrusion with a pipe. The process comprises treating at least some of the microspheres to be incorporated in the polyolefin with a chain-scission agent; distributing the microspheres evenly in the polyolefin in its melt phase; and forming the composite material into a desired shape and cooling.

EP-A-0473215 includes specific examples of test pieces that are satisfactory for pipe extrusions, although no such extrusions are exemplified. EP-A-0473215 also suggests that the composite material can be extruded in the form of tapes and applied by "side-wrapping" to a steel pipe as that rotates.

During fabrication of an insulated flexible flowline, the insulation material which is applied in a tape form experiences severe tensile forces. To adequately meet these forces, dependent on the pipe diameter and tape dimensions, elongation at break of 1% to 40% or more is needed. Further, the surface of the tape should not have any notches or defects as these cause the tape to break during winding. Further, the tape needs to be able to be manufactured in continuous lengths of several km.

In addition, during service of an insulated flowline, the insulation material should have an adequate thermal conductivity which may be derived from the presence of intact hollow glass microspheres. It is imperative that both during the manufacture of the syntactic foam tape and during the fabrication of the insulated flowline the microspheres do not break.

Further, as indicated above, the insulation material should maintain the insulating properties during the service life (10 to 30 years) by withstanding high hydrostatic compression and creep.

It is known from polypropylene extrusion that, to obtain a smoother surface finish, die temperatures higher than normal (210° C.) and longer land length are needed (i.e., relatively high ratio of die land length l to die thickness t.). Higher temperatures should also minimize microsphere breakage. However, when this conventional wisdom was applied to materials of the type described above, tapes and melts of unacceptable shark-skin effect resulted. The shark-skin effect is less relevant when using the pipe extrusion technique (as is also flexibility), and will in any event usually be covered by an outer plastics layer (produced by coextrusion).

SUMMARY OF THE INVENTION

It has now been found that reducing the die ratio l:t below 7:1 will enable polyolefin/microsphere composites to be extruded into tapes or sheets with a substantially smooth surface. Accordingly, the present invention provides a process for producing a smooth-surfaced tape or sheet from a composite material of polyolefin and hollow microsphere filler by extrusion through a die, characterized in that that die has a land length to thickness (l:t) ratio less than 7:1 and preferably at most 5:1. Contrary to normal practice, it has been found that increasing the extrusion temperature worsens the surface-finish, whereas reduction of that temperature facilitates the production of a substantially smooth surface, free from shark-skin. Hence, the extrusion temperature should be about 215° C., preferably from about 205° C. to about 225° C. The production of a smooth surface is also facilitated by increasing the back-pressure in the extrusion, suitably by modification of the die profile.

DESCRIPTION OF THE INVENTION

It has also been found, in one embodiment, that under such processing conditions chemical foaming agents can be introduced during melt processing, to give a desired foamed foam tape or sheet product. The foaming agent is conventional, e.g., a $CO_2$- or $N_2$-releaser and many are known in the art. The density of the product is thus reduced to 0.3 g/cm$^3$ or below. The unfoamed product has a minimum density of about 0.6 g/cm³. The maximum density of the product is about 0.9 g/cm³.

The density of the novel product is one of the parameters determining its thermal conductivity. Another is the filler content, particularly the hollow microspheres.

The filler comprises hollow microspheres substantially alone or in combination with other filler materials including non-hollow filler materials, for example talc, chalk, barium carbonate or chopped glass fibers. Preferably, however, the filler substantially consists of hollow microspheres (although in interpreting this statement it should be noted that any given sample of microspheres may contain a minor proportion of broken or solid microspheres). It should also be noted that the term "microspheres", the accepted term of art for the filler materials in question, is not a term of geometrical precision. The majority of the microspheres may or may not be truly spherical.

In one embodiment, the microspheres are mixed with the polyolefin in particulate form and the material heated, to melt the polyolefin. Preferably, however, the microspheres are added to be polyolefin in its melt phase.

Preferably, the microspheres are present in the resulting composite material in an amount of from 5% to 70%, more preferably 30% to 60%, by volume, with respect to the volume of the composite material.

Microspheres are made of various plastics and inorganic materials. A preferred material is an inorganic glass, preferably a silica-based glass. A particularly preferred material comprises a major proportion of silica and minor proportions of an alkali metal oxide and $B_2O_3$.

The bulk density of the microspheres is suitably from about 0.07 g/ml to 0.6 g/ml, preferably 0.3 g/ml to 0.5 g/ml. The diameter of the microspheres is typically 10 µm to 200 µm, preferably. Their isostatic compressive strength is 1000 psi to 2500 psi ($6.9 \times 10^6$ Pa–$1.03 \times 10^8$ Pa), preferably 2000 psi to 15000 psi ($3.4 \times 10^7$ Pa–$1.03 \times 10^8$ Pa).

The polypropylene, polybutylene or other polyolefin used in this invention is a homo- or co-polymer. Suitable copolymers are those comprising from 5% to 20 wt % of ethylene as comonomer. The polyolefins are employed in the form of a blend with one or more other polymers, such blends then comprising 1% to 50%, preferably 10% to 40% by weight of other polymers such as polyamides and thermoplastic elastomers, e.g., those sold under the Trade Mark KRATON, and EPDM rubbers.

A preferred polyolefin for use in the present invention is based on polypropylene, preferably syndiotactic polypropylene. Polybutylene materials, when employed, is preferably based on 1butene.

Suitably, the MFI of base polymers (whether homo-, co- or terpolymers) is in the range 2 to 60, preferably 2 to 20, most preferably 3 to 10, g.10 min⁻¹ (per ISO 1133).

The polyolefin desirably also contains an antioxidant. It is also preferred to include a lubricant such as calcium stearate.

The composite material is provided as tapes or, preferably, pellets, for use in a later extrusion process. Alternatively, a sheet of the composite material is produced, for use in a later compression molding or thermoforming process.

A sheet or tape of the invention is, for example, 1 mm to 10 mm thick. A tape is 10 mm to 100 mm wide. The length is unlimited; lengths of 5 km or more are useful.

The composite material is suitable for use as a flowline insulation composition. One method of forming a flowline insulation comprises extruding the composite materials as a tape onto a steel pipe as by side-wrapping. For this purpose, a product of the invention should have sufficient flexibility that it can be satisfactorily wound around a pipe which is, say, 100 mm in diameter. If desired, the contact between the composite material and the steel pipe may be improved by means of a carboxylated polyolefin layer therebetween.

Alternatively, an insulated flowline is prepared by covering it with the composite material as a melt. In this case, the material may be in the form of a band up to 1000 mm wide and 10 mm thick. Perhaps the most important parameters of the melt are its melt strength and melt elongation. Its melt strength at 220° C. is preferably about 5 kPa to about 20 kPa. Its melt elongation is preferably from about 200% to about 700%.

The following examples (conducted using materials comprising polypropylene and glass microspheres, available as "CARIZITE"), illustrate the invention. A Surtronic 3 surface measuring apparatus was used to detect surface finish. Ra is the "average roughness" determined by the instrument and is calculated as (h1+h2+h3+hn)/L where L is the sampling length. Rt is the maximum peak-valley distance of the sample. A "good" surface finish corresponds to an Ra of less than 20 µm and/or an Rt of less than 100 µm. A "fair" surface finish corresponds to an Ra of greater than 20 and less than 35 µm and/or an Rt of greater than 100 and less than 150 µm. A "poor" surface finish corresponds to an Ra of greater than 35 µm and/or an Rt of greater than 150 µm.

EXAMPLE 1

Die Area

Extrusions were conducted on a polypropylene syntactic foam material containing 25% m of microspheres and an appropriate heat stabilization system, at various temperature using a Cincinnati-Milacron A2/80 extruder with counter rotating, parallel screws. The results in Table 1 show that when using a die of cross sectional area 250mm² and melt temperature from 176° C. to 182° C. the surface finish of the resultant tape was rated as Poor. Halving the cross-sectional area of the die to 125 mm², and processing at similar melt temperatures, resulted in producing a tape with a smooth surface and a "Good" rating. This cross-sectional area is useful for materials of MFI from 2 to 5 and for dies with die ratios (land length l to die thickness t) from 26:1 to 4:1 (the actual land lengths being from 75 to 15 mm).

EXAMPLE 2

Processing temperature

Extrusions were conducted on a polypropylene syntactic foam material, containing 20% m of microspheres, at various temperatures using a Baker Perkins MP 2030 twin-screw co-rotating, compounding extruder. The results in Table 2 show a processing temperature, in this case 215° C., in which a surface finish rated as "Good" was combined with a high tensile strength and elongation at break. For the other temperatures tested the surface finish and tensile properties deteriorated. In all of these tests, the die cross-sectional area was 250 mm$^2$ and the die land length ratio (l:t) was 5:1.

EXAMPLE 3

Die land length

Using a Cincinnati-Milacron A2/80 extruder with counter rotating twin parallel screws and a syntactic foam material containing 25% of microspheres within polypropylene of Melt Flow Index 2.7, experiments were carried out with 3 extrusion dies, each having a cross-sectional area of 250 mm$^2$ but with land length ratios varying from 20:1 to 2:1. The results in Table 3 show that, at a mass temperature of 176° C. the dies of higher ratios (longer die land length) produced tape with a "Poor" surface finish. At a ratio of 2:1 the finish improved to "Fair/good" rating.

TABLE 1

Influence of Die X-Sectional Area on Surface Finish

| Surface Finish | X-Section mm$^2$ | M.F.I. g.10 min$^{-1}$ | Temp. deg. C. | Die Ratio l:t |
|---|---|---|---|---|
| Poor | 250 | 3.2 | 176 | 20:1 |
| Poor | 250 | 3.2 | 182 | 20:1 |
| Poor | 250 | 2.2 | 183 | 20:1 |
| Good | 125 | 4.8 | 181 | 26:1 |
| Good | 125 | 2.1 | 181 | 26:1 |
| Good | 125 | 4.8 | 174 | 4:1 |
| Good | 125 | 2.1 | 177 | 4:1 |

TABLE 2

Effect of Processing Temperature on Tape Properties

| Surface Finish | Temp. Deg. C. | M.F.I. g.10 min$^{-1}$ | Tensile Strength (mPa) | Elongation at Break (%) |
|---|---|---|---|---|
| Poor | 200 | 3.0 | 11.3 | 90 |
| Good | 215 | 3.2 | 12.7 | 115 |
| Poor | 230 | 3.4 | 12.6 | 95 |

TABLE 2-continued

Effect of Processing Temperature on Tape Properties

| Surface Finish | Temp. Deg. C. | M.F.I. g.10 min$^{-1}$ | Tensile Strength (mPa) | Elongation at Break (%) |
|---|---|---|---|---|
| Poor | 245 | 2.8 | 11.1 | 85 |
| Poor | 260 | 2.9 | 11.7 | 65 |

TABLE 3

Effect of Die Land Length on Surface Finish

| Surface Finish | Temp. Deg. C. | M.F.I. g.10 min$^{-1}$ | Die Ratio l:t |
|---|---|---|---|
| Poor | 176 | 2.7 | 20:1 |
| Poor | 176 | 2.7 | 7:1 |
| Fair/Good | 176 | 2.7 | 2:1 |

What is claimed is:

1. A process for producing a smooth-surfaced microsphere filled polyolefin tape or sheet having an average roughness of less than 20μ and/or a maximum peak-valley distance of less than 100μ as measured on a surface measuring apparatus comprising: extruding a composite material of a polyolefin and hollow microsphere filler through a die, wherein the die has a cross sectional area of about 250 mm$^2$ and a land length to thickness (l:t) ratio less than 7:1, and the temperature of extrusion is greater than 200° C. and less than 230° C.

2. The process of claim 1 wherein the die ratio l:t is at most 5:1.

3. The process of claim 2 wherein the extrusion temperature is about 215° C.

4. The process of claim 1 wherein the die thickness is from 1 mm to 10 mm and the die width is from 10 mm to 100 mm.

5. The process of claim 4 wherein the polyolefin is polypropylene and the microspheres are of an inorganic glass.

* * * * *